A. DU BRUL.
VARIABLE SPEED GEAR.
APPLICATION FILED MAR. 2, 1908.
919,329.
Patented Apr. 27, 1909.
2 SHEETS—SHEET 1.
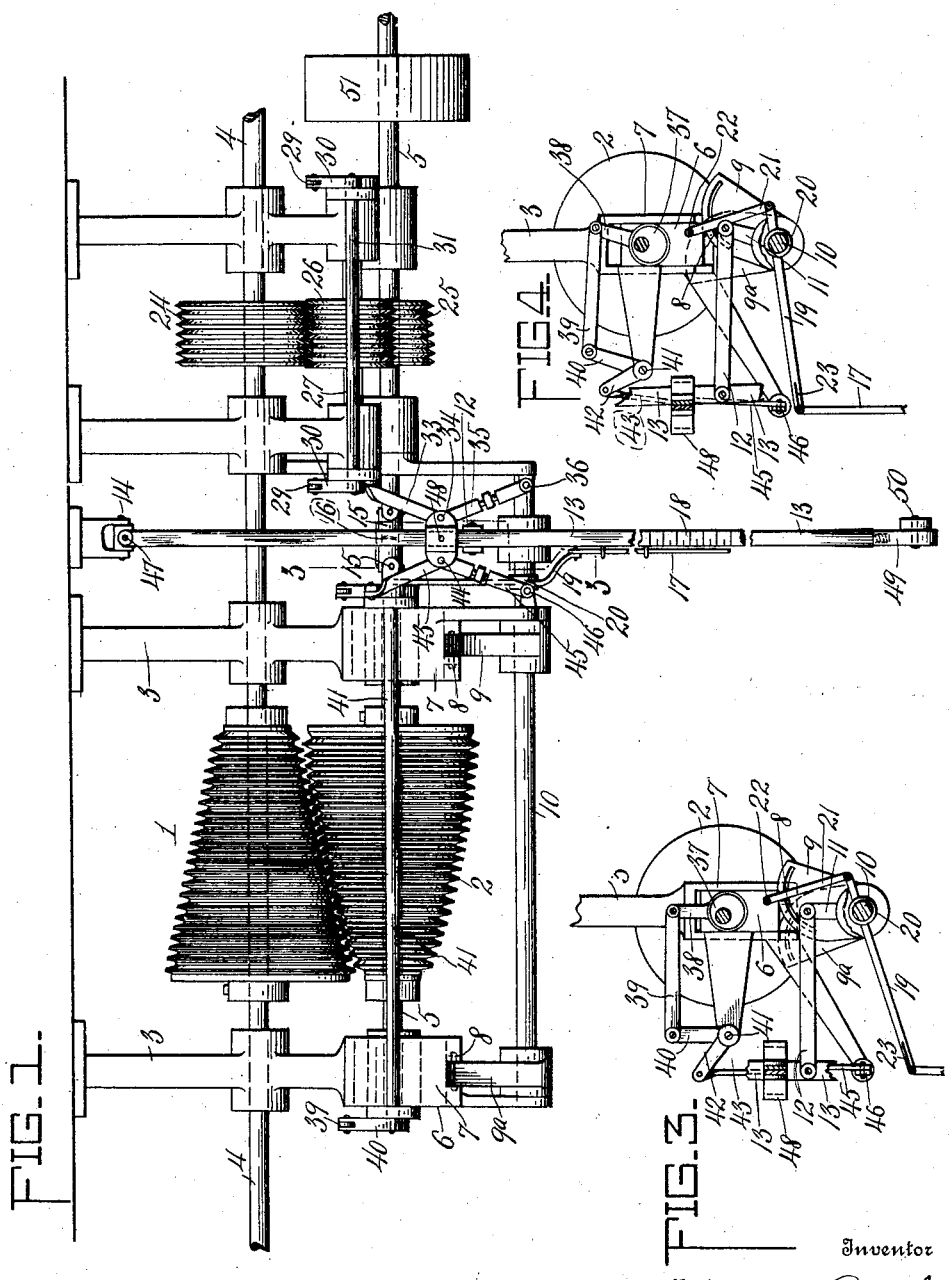
Witnesses
W. J. Allen
L. R. Nevitt
Inventor
Albert Du Brul
By
Knight Bros
Attorneys

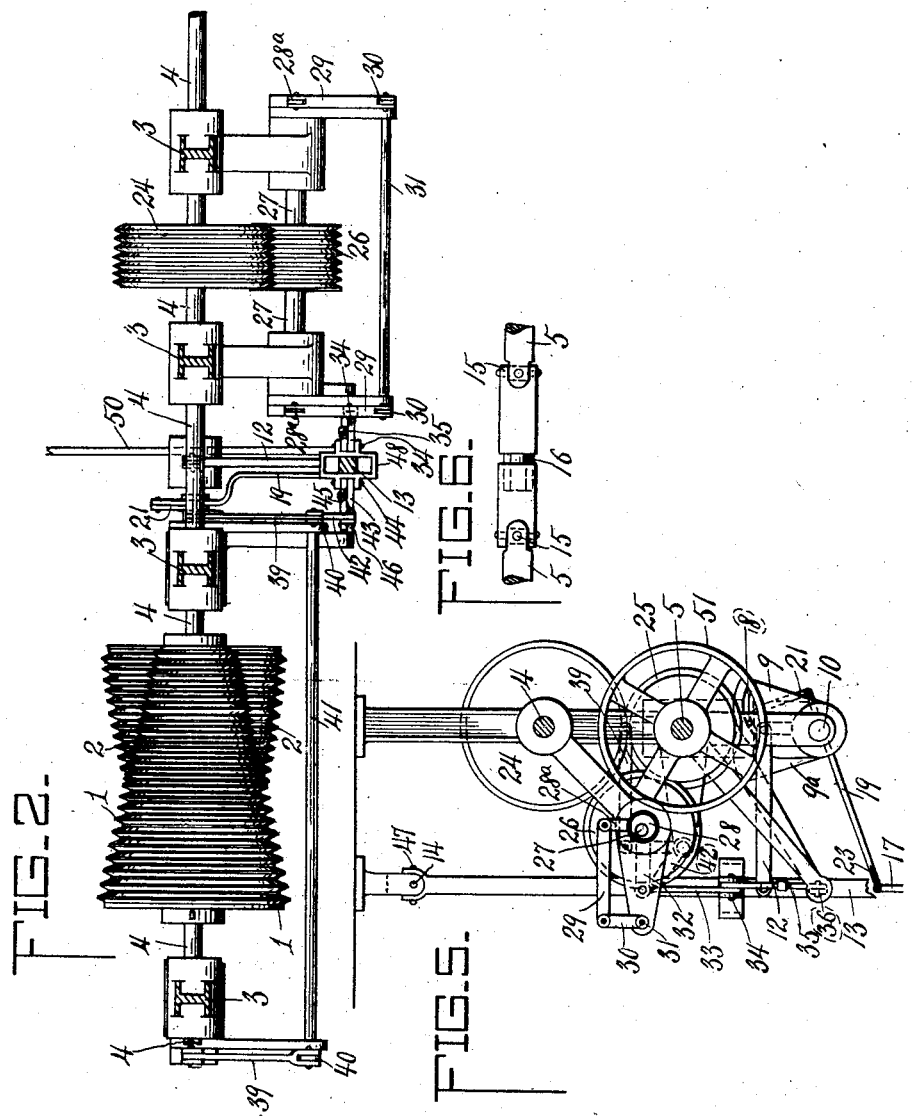

UNITED STATES PATENT OFFICE.

ALBERT DU BRUL, OF NEWPORT, KENTUCKY.

VARIABLE-SPEED GEAR.

No. 919,329.      Specification of Letters Patent.      Patented April 27, 1909.

Application filed March 2, 1908. Serial No. 418,717.

*To all whom it may concern:*

Be it known that I, ALBERT DU BRUL, a citizen of the United States, and resident of Newport, in the county of Kenton and State of Kentucky, have invented certain new and useful Improvements in Variable-Speed Gears, of which the following is a specification.

My invention relates to means for varying the speed at which motion may be transmitted from a driving to a driven member, and the object of my invention is to construct a device for this purpose which will be of simple construction and efficient in service.
My invention also relates to means whereby speed varying members may be thrown out of gear and replaced by a reversing connection.

My invention further consists in certain novel details of construction of the parts and members which go to make up the device.

In the accompanying drawings:—Figure 1 is a side elevation of the complete speed changing and reversing mechanism; Fig. 2 is a plan of the same; Fig. 3 is a sectional view of the speed gear controlling connections taken on the line 3—3, Fig. 1, and showing the relative positions of the parts when the roll 2 is in driven position; Fig. 4 is the same as Fig. 3, showing the positions of the parts when the rolls are not in driving relation; Figs. 5 and 6 are respectively detail views of the controlling connections for the reversing gear, and the universal and sliding connection interposed in the angularly shifting driven shaft.

1 represents a conical driving roll and 2 a conoidal driven roll adapted to be brought into direct contact with the roll 1. These rolls are provided with surface corrugations in the planes transverse to their axes which increase the frictional engagement of the rolls and prevent their relative displacement in axial directions. These rolls are mounted in brackets 3 through the medium of the drive shaft 4 and the driven shaft 5 respectively. The driven shaft 5 is mounted in bearing blocks 6 which have vertical sliding movement as well as angular adjustability in the frames 7 of the brackets 3 so that the roll 2 may be moved bodily to and from the roll 1 for bringing them into and out of driving relation and also may have its axis shifted angularly relatively to the axis of the roll 1 for the purpose of rocking the roll 2 on the roll 1 or relatively thereto, and varying the point of driving contact between the rolls; thus, the smallest diameter of the driven roll may be brought into driven relation with the greatest diameter of the driving roll for the purpose of developing the highest speed in the driven shaft, or the greatest diameter of the driven roll may be brought into driven relation with the smallest diameter of the driving roll for the purpose of developing the slowest speed in the driven shaft; or driving relation may be established at any intermediate point and with corresponding effect in the speed developed, contact between the rolls at the point corresponding to their mean diameters causing a transmission of rotation without change of speed.

For the purpose of rocking the driven roll 2 relatively to the driving roll 1 for the purpose of varying the point of contact, slide blocks 6 carry pins 8 which work in the grooves of oppositely disposed cams 9 on the rock shaft 10 so that when the shaft 10 is rocked, in either direction, one block will be moved upward and the other block downward. Rocking movement is imparted to shaft 10 through the medium of an arm 11 projecting therefrom and connected through a link 12 with a controlling lever 13 which has a fulcrum 14 permitting it to move in a plane transverse to the shafts of the rolls. By this transverse movement of shaft 13, the point of contact between the rolls, and consequently the speed may be determined at will. In order to permit angular movement of that portion of the shaft 5 which carries the driven roll 2, I prefer to employ a double universal and sliding joint 15, 16, (see Fig. 6.)

In order to indicate the speed being transmitted, I employ an indicator rod 17 moving relatively to a scale 18 on the controlling lever 13, this indicator rod being connected by an indicator lever 19, fulcrumed at 20, with a link 21 which is in turn connected at 22 with one of the sliding blocks 6. As the block 6 moves to shift the angle of the shaft 5, it imparts movement to the lever 19 and through the latter to the indicator rod 17. As the position of the block 6 corresponds at all times to the point of driving contact, the scale 18 may be so adjusted or located as to indicate accurately the speed that is to be transmitted and thus it becomes an easy matter to set the device repeatedly for the same speed.

In connection with the movement of the driven roll bodily out of driving relation to the driving roll, it is desirable to employ a reversing gear, for many purposes, such for instance as running back the cutting tool on a machine, and according to my present invention I provide means for accomplishing this purpose and bring the same under the control of the common controlling lever 13.

24, 25 represent cylindrical driving and driven rolls upon the driving and driven shafts, provided with surface corrugations or interengaging grooves, to increase their friction and 26 is a transmitting idler adapted to reverse the driving connection between the rolls 24 and 25. Idler 26 has its journals 27 mounted in eccentrics 28 which carry arms 28ª connected by links 29 with crank arms 30 on a rock shaft 31. By this means identical rotation of the eccentrics 28 at opposite ends of the idler 26 is insured. Eccentric 28 at the inner end of idler 26 is further provided with a crank arm 32 that receives one member 33 of a toggle lever which is pivoted at 34 to the yoke 48 mounted upon lever 13, and has its other member 35 fulcrumed at the fixed point 36. With this arrangement, movement of the lever 13 in a plane parallel to the shafts of the device, causes upward pressure on the crank arm 32 of the eccentric 28 and rotates both eccentrics 28 in a direction to press the idler 26 into driving position between the rolls 24, 25.

To bodily move the driven roll 2 away from or into contact with the roll 1, the mounting of the shaft 5 in the block 6 is accomplished through the medium of eccentrics 37 having levers 38 which are connected by links 39 with crank arms 40 upon a rock shaft 41, so that said eccentrics 37 are caused to rotate in unison in directions to bring the roll 2, to and from the roll 1. To impart the necessary movement to rock shaft 41, the latter is provided with a crank arm 42 which receives the upper member 43 of a toggle lever which is pivoted at 44 to the yoke 48 and has its lower member 45 fulcrumed at the fixed point 46, so that when the lever 13 is moved toward the left in a plane parallel to the shafts of the device, eccentrics 37 will be rotated in a direction to force the driven roll 2 into driving relation with the driving roll 1. It will also be seen that the last mentioned movement will be accompanied by the withdrawal of the idler 26 from its driving relation and as the movement of the lever 13 to the right, to throw in the reverse drive has the effect of withdrawing the speed gear, it follows that the lever 13 and the connections through which it controls the speed and reverse gears, provide means whereby said gears are reciprocally thrown into and out of operative position. 47 represents the fulcrum permitting this right and left movement of lever 13.

The movement for angularly shifting the driven roll, being in a plane at right angles to that for reciprocally throwing the speed and reverse gears into and out of operation, is not affected by movements for the last named purpose. On the contrary, either movement may be effected independently of the other; that is to say, at any given speed adjustment, the speed gear and reverse gear can be reciprocably thrown into and out of action and the speed adjustment may be set while the speed gear is out of action, so that when the speed gear is again made effective, the driving connection will be established at the point corresponding to the adjustment that has been previously arranged.

For some classes of machinery, as for instance, machines employing a transverse feed for dressing a rotating work piece, it is desirable to increase the speed at which the work is rotated as the tool approaches the center of rotation where surface travel is correspondingly reduced, and to reduce the speed of rotation as the tool is working upon the outer portions of the work where surface speed is relatively greater than at the center. My device is well adapted for automatically effecting variations in speed for such purposes as this, and to facilitate this result I provide the controlling lever 13 with an extension 49 that may be coupled as shown at 50 to a part representing a cross feed member in a metal working machine, this extension 49 being removable however, to avoid inconvenience where the hand control is desired.

51 represents a pulley by which power at the developed speed may be transmitted from the shaft 5 to the machine to be operated.

Having thus described my invention, what I claim, and desire to secure by Letters Patent, is:—

1. In a speed changing gear, the combination of a rotary driving or driven member, a rotary member coöperating therewith, constructed with a varying diameter, said rotary members having interengaging surface grooves increasing friction and preventing relative axial displacement between them, means holding the rotary members in direct driving contact, and means for angularly shifting the axes of the rotary members relatively for the purpose of changing the point of contact between the members.

2. In a speed changing gear, the combination of the rotary members in direct frictional contact, one of which has a convex surface and both of which have their contacting surfaces grooved for the purpose of increasing friction and preventing relative axial displacement between them, and means for shifting one of the members relatively to the other in a direction transverse to its axis, whereby different portions of the convex surface of one rotary member are brought into driving contact with the other rotary member.

3. In a speed changing gear, the combination of rotary members adapted to have direct driving contact one with the other, one of said members being constructed with a convex contacting surface, both of said members being constructed with interengaging surface grooves for increasing their friction and preventing relative axial displacement between them, and one of said members having bearings which permit movement of the journals in the plane of the axes of the two members.

4. In a speed changing gear, the combination of the directly contacting grooved members, one of which has a convex surface which limits its frictional driving contact with the other member, sliding journal-bearings for one of said members, which permit changing the relative angular positions of the axes of the two members.

5. In a speed changing gear, the combination of the directly contacting grooved members, one of which has a convex surface which limits its frictional driving contact with the other member, sliding journal-bearings for one of said members, which permit changing the relative angular positions of the axes of the two members; said journal bearings being also mounted to move angularly to correspond to changes in the position of the axis of the rotary member which they support.

6. In a speed changing gear, the combination of the directly contacting grooved members, one of which has a convex surface which limits its frictional driving contact with the other member, sliding journal-bearings for one of said members, which permit changing the relative angular positions of the axes of the two members; and a rock shaft having arms constructed with cams through which the arms engage the respective journal bearings; said cams being oppositely disposed in their relations to the journal bearings so that as the shaft is rotated in one direction one journal bearing will be moved toward the coacting rotary member and the other journal bearing away from said member and when the rock shaft is rotated in the opposite direction, the movements of the journal bearings will be reversed.

7. In a speed changing gear, the combination of the directly contacting correspondingly grooved rotary members, one of which is mounted to receive angular adjustment to change the point of contact with the other member, means for imparting such angular adjustment, and means for moving the members out of and into driving contact at will.

8. In a speed changing gear, the combination of the directly contacting correspondingly grooved and relatively shifting rotary speed-changing members, means for imparting movement which shifts the members relatively, means for moving the said members into and out of driving contact, a reversing gear, the members of which are connected with the respective speed changing members, and means for throwing the reversing gear into and out of operation, connected and movable simultaneously with the means which throws the speed changing members out of and into contact.

9. In a speed changing gear, the combination of the rotary driving and driven members, means shifting their relative angular positions to vary the point of contact between them, means shifting them bodily into and out of driving relation, and a common lever controlling both said shifting means; said lever being connected to operate one of said shifting means by a movement in one direction and to operate the other shifting means by a movement in another direction.

10. In a speed changing gear, the combination of the rotary driving and driven members, means shifting their relative angular positions to vary the point of contact between them, means shifting them bodily into and out of driving relation, and a common lever controlling both said shifting means; said lever being connected to operate one of said shifting means by a movement in one direction and to operate the other shifting means by a movement in another direction; said lever being adapted to move in either direction from any point of adjustment to which it has been moved in the other direction.

11. In a speed changing gear, the combination of the rotary driving and driven members, means shifting their relative angular positions to vary the point of contact between them, means shifting them bodily into and out of driving relation, and a common lever controlling both said shifting means; said lever being connected to operate one of said shifting means by a movement in one direction and to operate the other shifting means by a movement in another direction; said lever being shiftable to throw the gear members out of driving relation from any point of speed changing adjustment to which the lever has been moved and movable to throw the speed changing members into driving relation without changing the speed adjustment of the lever.

12. In a speed changing gear, the combination of the rotary driving and driven members, means shifting their relative angular positions to vary the point of contact between them, means shifting them bodily into and out of driving relation, and a common lever controlling both said shifting means; said lever being connected to operate one of said shifting means by a movement in one direction and to operate the other shifting means by a movement in another direction; said lever being adjustable to correspond to any desired speed obtainable from the gear, while the gear members are out of driving relation and being movable to bring the gears into driving relation without changing the speed adjustment.

13. In a speed changing gear, the combination of the rotary speed-changing gear members, means for effecting the speed changing adjustment, means for throwing the gear members into and out of driving relation, a reverse gear, means for throwing the reverse gear into and out of operation connected with the means which throws the speed-changing gear into and out of operation and moving reciprocally therewith and a common lever for controlling the several movements movable in one plane to determine the speed adjustment and movable in another plane for the purpose of controlling the movements of the speed-changing and reverse gears.

14. In a speed-changing gear, the combination of the rotary members, means for adjusting the driving relations of said members for determining the speed imparted thereby, a lever for controlling said adjustment, and a hand indicator movably mounted in relation to said lever and connected with a part with relation to which the lever moves in its adjustments whereby the indicator is moved upon the lever to indicate the adjustment of the latter.

15. In a speed changing gear, the combination of the directly contacting and angularly shiftable gear members, the sliding journal block through which angular adjustment is effected, the lever having suitable connections through which it shifts said journal block, the indicator mounted to move relatively to said lever, and a suitably fulcrumed indicator lever connected at one end with said indicator and at the other end with the sliding journal block, whereby the speed to which the gear is adjusted is indicated upon the controlling lever.

16. In a speed changing gear, the combination of the rotary gear members, one of which is mounted in movable journal bearings to permit the members to be thrown into and out of driving relation, toggle levers controlling the movements of the respective journal bearings, and a controlling lever having connections with both toggle levers; said toggle levers being adjustable in length to compensate for wear upon the gear members.

17. In a speed changing gear, the combination of the frictional gear members, one of which is bodily movable relatively to the other to throw them into and out of driving relation, suitably mounted eccentrics in which said movable member is journaled to permit said bodily movement, means imparting simultaneous movement to said eccentrics for developing said bodily movement, sliding blocks in which said eccentrics are mounted, and means imparting opposite movements to said sliding blocks for changing the angular position of the movable member relatively to the other member and varying the point of driving contact between the members.

18. In a combined speed changing and reverse gear, the combination of the speed changing members and the reversing members, one of each of which is journaled in eccentrics to permit its being moved bodily into and out of driving relation to a co-acting member, and an adjusting lever having connections through which it rotates said eccentrics to move them simultaneously; said connections being adjusted to impart reciprocal movements to the members which they control whereby the reverse gear member is moved into driving relation as the speed changing gear member moves out of driving relation, and vice versa.

19. In a combined speed changing and reverse gear, the combination of the speed changing members and the reversing members, one of each of which is journaled in eccentrics to permit its being moved bodily into and out of driving relation to a co-acting member, and an adjusting lever having connections through which it rotates said eccentrics to move them simultaneously; said connections being adjusted to impart reciprocal movements to the members which they control whereby the reverse gear member is moved into driving relation as the speed changing gear member moves out of driving relation, and vice versa; said connections comprising arms extending from the eccentrics, a rock shaft having connections with the eccentric arms, and toggle levers controlling said rock shafts and having connections through which they are controlled by the adjusting lever.

The foregoing specification signed at Cincinnati, Ohio, this twenty-eighth day of February, 1908.

ALBERT DU BRUL.

In presence of two witnesses—
  LOUIS P. PINK,
  W. M. BEINHART.